United States Patent
Isobe et al.

(10) Patent No.: US 8,523,446 B2
(45) Date of Patent: Sep. 3, 2013

(54) SENSOR EQUIPPED WHEEL SUPPORT BEARING ASSEMBLY

(75) Inventors: Hiroshi Isobe, Iwata (JP); Toru Takahashi, Iwata (JP); Takayoshi Ozaki, Iwata (JP)

(73) Assignee: NTN Corporation, Osaka (JP)

( * ) Notice: Subject to any disclaimer, the term of this patent is extended or adjusted under 35 U.S.C. 154(b) by 511 days.

(21) Appl. No.: 12/452,908

(22) PCT Filed: Jul. 30, 2008

(86) PCT No.: PCT/JP2008/002030
§ 371 (c)(1),
(2), (4) Date: Jan. 28, 2010

(87) PCT Pub. No.: WO2009/016829
PCT Pub. Date: Feb. 5, 2009

(65) Prior Publication Data
US 2010/0129016 A1    May 27, 2010

(30) Foreign Application Priority Data
Jul. 31, 2007  (JP) .................. 2007-199218

(51) Int. Cl.
*F16C 32/00*  (2006.01)
*G01L 3/14*   (2006.01)

(52) U.S. Cl.
USPC ................. 384/448; 73/862.322

(58) Field of Classification Search
USPC ............ 384/448, 544, 589; 73/862.322
See application file for complete search history.

(56) References Cited

U.S. PATENT DOCUMENTS

| | | | |
|---|---|---|---|
| 4,341,122 A | 7/1982 | Lechler et al. |
| 6,535,135 B1 | 3/2003 | French et al. |
| 6,634,208 B2 | 10/2003 | Salou et al. |
| 6,920,801 B2 | 7/2005 | Van Leeuwen et al. |
| 6,971,799 B2 | 12/2005 | Sato et al. |
| 7,178,413 B2 | 2/2007 | Hofmann et al. |
| 7,249,528 B2 | 7/2007 | Inoue |
| 7,604,413 B2 | 10/2009 | Koike et al. |

(Continued)

FOREIGN PATENT DOCUMENTS

| | | |
|---|---|---|
| EP | 1 593 948 A1 | 11/2005 |
| JP | 55-132926 A | 10/1980 |

(Continued)

OTHER PUBLICATIONS

Chinese Office Action issued Jan. 12, 2011 in corresponding Chinese Patent Application 200880101290.1.

(Continued)

*Primary Examiner* — James Pilkington (57) ABSTRACT

This wheel support bearing assembly includes an outer member, an inner member, and a plurality of rows of rolling elements between opposed rolling surfaces in both members. At least one sensor unit is provided on the outer diametric surface of the outer member, which is stationary. The sensor unit is made up of a strain generating member having two or more contact fixing segments adapted to be fixed to an outer diametric surface of the outer member in contact therewith and a sensor fitted to the strain generating member for detecting a strain induced in this strain generating member. A groove is provided in the outer diametric surface of the outer member at a location adjacent to the neighboring two contact fixing segments of the sensor unit.

9 Claims, 10 Drawing Sheets

(56) References Cited

U.S. PATENT DOCUMENTS

| | | | |
|---|---|---|---|
| 7,628,540 | B2 | 12/2009 | Iwamoto et al. |
| 7,631,553 | B2 | 12/2009 | Heim |
| 7,661,320 | B2 | 2/2010 | Duret et al. |
| 7,762,128 | B2 * | 7/2010 | Ozaki et al. ............... 73/117.01 |
| 8,123,411 | B2 * | 2/2012 | Norimatsu et al. ........... 384/448 |
| 8,167,497 | B2 * | 5/2012 | Ozaki et al. ................... 384/448 |
| 2002/0012484 | A1 | 1/2002 | Salou et al. |
| 2002/0061148 | A1 | 5/2002 | Salou et al. |
| 2002/0097040 | A1 | 7/2002 | Takizawa et al. |
| 2003/0218548 | A1 | 11/2003 | Sato et al. |
| 2004/0031311 | A1 | 2/2004 | Meyer et al. |
| 2005/0016296 | A1 | 1/2005 | Inoue |
| 2007/0157742 | A1 | 7/2007 | Kouduki et al. |
| 2009/0038414 | A1 | 2/2009 | Ozaki et al. |
| 2009/0044633 | A1 | 2/2009 | Duret et al. |
| 2009/0080822 | A1 | 3/2009 | Ozaki et al. |
| 2009/0097791 | A1 | 4/2009 | Ozaki et al. |
| 2009/0129712 | A1 | 5/2009 | Ozaki et al. |
| 2009/0199660 | A1 | 8/2009 | Ozaki et al. |
| 2009/0229379 | A1 | 9/2009 | Ozaki et al. |
| 2009/0301222 | A1 | 12/2009 | Takahashi et al. |
| 2009/0324152 | A1 | 12/2009 | Ozaki et al. |
| 2010/0046871 | A1 | 2/2010 | Norimatsu |
| 2010/0135604 | A1 | 6/2010 | Ozaki et al. |

FOREIGN PATENT DOCUMENTS

| | | | |
|---|---|---|---|
| JP | 55-156608 | | 12/1980 |
| JP | 59-163531 | A | 9/1984 |
| JP | 63-256832 | A | 10/1988 |
| JP | 6-32735 | | 4/1994 |
| JP | 9-61268 | | 3/1997 |
| JP | 2002-98138 | | 4/2002 |
| JP | 2002-340922 | | 11/2002 |
| JP | 2003-166888 | A | 6/2003 |
| JP | 2003-172347 | | 6/2003 |
| JP | 2003-530565 | | 10/2003 |
| JP | 2003-336653 | | 11/2003 |
| JP | 2004-3601 | | 1/2004 |
| JP | 2004-142577 | | 5/2004 |
| JP | 2004-183684 | | 7/2004 |
| JP | 2005-502892 | A | 1/2005 |
| JP | 2005-37298 | A | 2/2005 |
| JP | 2005-77236 | | 3/2005 |
| JP | 2006-77807 | | 3/2006 |
| JP | 2007-57258 | | 3/2007 |
| JP | 2007-57259 | | 3/2007 |
| JP | 2007-57300 | | 3/2007 |
| JP | 2007-57302 | | 3/2007 |
| JP | 2007-71280 | | 3/2007 |
| JP | 2007-78615 | | 3/2007 |
| JP | 2007-155079 | | 6/2007 |
| JP | 2007-155629 | | 6/2007 |
| JP | 2007-292158 | | 11/2007 |
| WO | 01/77634 | A2 | 10/2001 |
| WO | 2007/054639 | A1 | 5/2007 |
| WO | WO2007/105367 | * | 9/2007 |
| WO | 2009/016820 | A1 | 2/2009 |

OTHER PUBLICATIONS

English Translation of the International Preliminary Report on Patentability mailed Mar. 4, 2010 in corresponding International Patent Application PCT/JP2008/002030.
Notification of Reason(s) for Rejection issued Jun. 7, 2011 in related Japanese Patent Application 2005-240908.
Notification of Reason(s) for Rejection issued Jun. 7, 2011 in related Japanese Patent Application 2005-240909.
U.S. Office Action mailed May 25, 2011 in possible related U.S. Appl. No. 11/990,071.
Japanese Office Action mailed Jun. 12, 2012 issued in related Japanese Patent Application No. 2007-199217.
Japanese Office Action mailed Jun. 12, 2012 issued in corresponding Japanese Patent Application No. 2007-199216.
U.S. Office Action issued Oct. 18, 2011 in related U.S. Appl. No. 11/990,071.
Chinese Office Action mailed Mar. 14, 2012 issued in related Chinese Patent Application No. 200680028967.4.
Chinese Office Action issued Jun. 14, 2011 in related Chinese Patent Application 200680028967.4.
Japanese Notification for Reason(s) for Rejection issued Aug. 23, 2011 in related Japanese Patent Application 2005-229211.
Japanese Office Action dated Dec. 20, 2011 issued in related Japanese Patent Application No. 2005-229211.
European Search Report dated Feb. 24, 2012 issued in corresponding European Patent Application No. 08790294.6.
U.S. Notice of Allowance mailed Jan. 5, 2012 issued in related U.S. Appl. No. 11/990,071.
International Search Report for PCT/JP2008/002030, mailed Oct. 28, 2008.
Chinese Office Action issued Mar. 24, 2011 in a related Chinese Patent Application 200880101293.5.
Japanese Office Action issued May 17, 2011 in a related Japanese Patent Application 2005-250576.
U.S. Appl. No. 11/990,071, filed Feb. 6, 2008, Takayoshi Ozaki, NTN Corporation.
U.S. Appl. No. 12/452,909, filed Jan. 28, 2010, Hiroshi Isobe, NTN Corporation.
U.S. Office Action issued Jul. 26, 2012 in related U.S. Appl. No. 12/452,909.
Extended and Supplementary European Search Report dated Jul. 30, 2012 issued in related European Patent Application No. 08790277.1.
U.S. Office Action issued in copending U.S. Appl. No. 12/452,909 mailed Nov. 7, 2012.

* cited by examiner

Prior Art

Fig. 12

SENSOR EQUIPPED WHEEL SUPPORT BEARING ASSEMBLY

CROSS REFERENCE TO RELATED APPLICATIONS

This application claims the benefit under 35 U.S.C. Section 371, of PCT International Application No. PCT/JP2008/002030, filed Jul. 30, 2008, which claimed priority to Japanese patent application No. 2007-199218, filed Jul. 31, 2007, the entire disclosures of which are herein incorporated by reference as a part of this application.

BACKGROUND OF THE INVENTION

This application is based on and claims Convention priority to Japanese patent application No. 2007-199218, filed Jul. 31, 2007, the entire disclosure of which is herein incorporated by reference as a part of this application.

The present invention relates to a sensor equipped wheel support bearing assembly having a load sensor built therein for detecting a load imposed on a bearing unit of a vehicle wheel.

As a technique for detecting a load imposed on each of vehicle wheels of an automotive vehicle, a sensor equipped wheel support bearing assembly capable of detecting the load by detecting a strain induced in an outer diametric surface of an outer ring flange of the wheel support bearing assembly. (See, for example, the Patent Document 1 listed below.) A wheel support bearing assembly has also been suggested, in which a strain amplifying mechanism in the form of an L-shaped member is fitted over a flange portion and an outer diametric portion of a stationary ring and a strain gauge is pasted to a portion of such strain amplifying mechanism. (See, for example, the Patent Document 2 listed below.)

[Patent Document 1] JP Laid-open Patent Publication No. 2002-098138

[Patent Document 2] JP Laid-open Patent Publication No. 2006-077807

According to the technique disclosed in the Patent Document 1 listed above, a strain generated as a result of deformation of a flange portion of a stationary ring is detected. However, such a problem has been found that since the deformation of the flange portion of the stationary ring is accompanied by a slippage occurring between a flange surface and a knuckle surface in the event that it exceeds a stationary frictional force, application of a repeated load results in generation of a hysteresis in an output signal.

Figure 12:
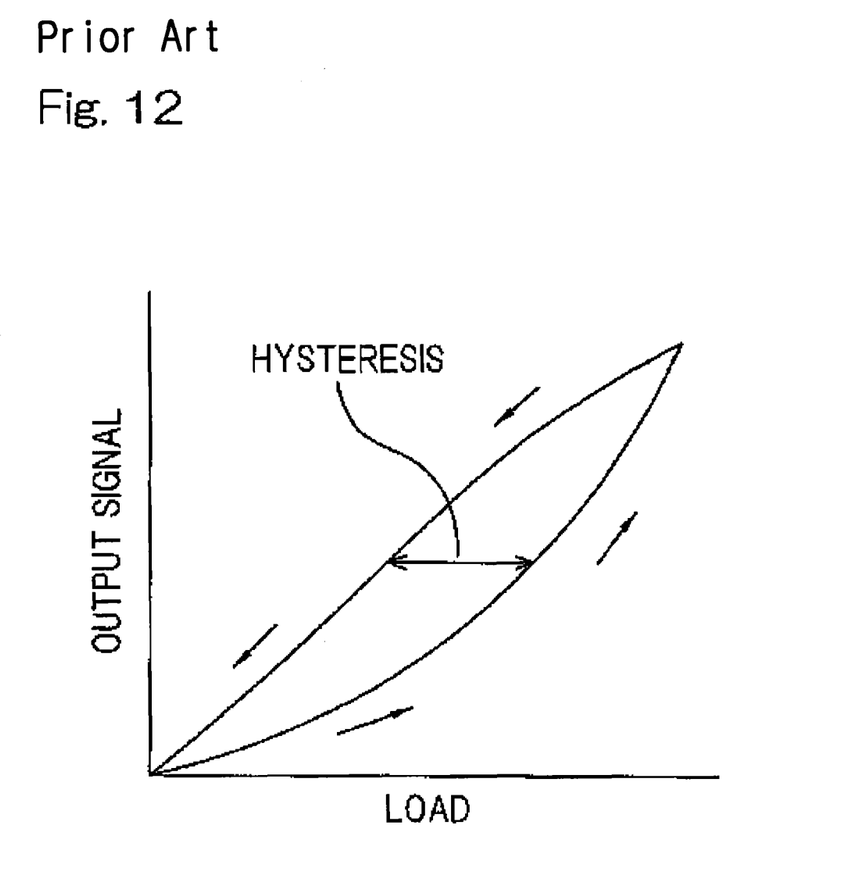
FIG. 12 is an explanatory diagram showing the hysteresis appearing in the output signal in the conventional example.

By way of example, in the event that the load acting in a certain direction relative to the wheel support bearing assembly becomes large, no slippage occur between the stationary ring flange surface and the knuckle surface because the stationary frictional force is initially higher than the load, but when it exceeds a certain quantity enough to overcome the stationary frictional force, the slippage occurs therebetween. If the load is reduced while in that condition, no slippage occur at first due to the stationary frictional force, but when it attains a certain magnitude, the slippage occurs. As a result, if an attempt to calculate the load is made at such a portion where the deformation occurs, such a hysteresis as shown in FIG. 12 occurs in the output signal.

Also, even in the technique disclosed in the Patent Document 2 listed above, a site at which the strain amplifying mechanism in the form of the L-shaped member is fixed to the flange surface, tends to be affected by a friction (slippage) occurring between the flange surface and the knuckle surface and, therefore, a problem similar to that discussed above is found therein.

Furthermore, where a load Fz acting on the wheel support bearing assembly in the vertical direction is to be detected, the amount of strain is small since the amount of a stationary ring deformation relative to the load Fz is small, and, accordingly, the above described techniques are incapable of detecting the load Fz with a high accuracy because of the detecting sensitivity being low.

SUMMARY OF THE INVENTION

An object of the present invention is to provide a sensor equipped wheel support bearing assembly capable of accurately detecting the load, imposed on the vehicle wheel, without being affected by influences brought about by the hysteresis.

The sensor equipped wheel support bearing assembly according to the present invention is a wheel support bearing assembly for rotatably supporting a vehicle wheel relative to a vehicle body structure and including an outer member having an inner periphery formed with a plurality of rows of rolling surfaces, an inner member having an outer periphery formed with rolling surfaces opposed to the rolling surfaces referred to above, and a plurality of rows of rolling elements interposed between those opposed rolling surfaces in both members, in which at least one sensor unit including a strain generating member having two or more contact fixing segments adapted to be fixed to an outer diametric surface of a stationary member, which is one of the outer member and the inner member, in contact therewith and a sensor fitted to the strain generating member for detecting a strain induced in this strain generating member is provided on the outer diametric surface of the stationary member and in which a groove is provided in the outer diametric surface of the stationary member at a location between the neighboring two contact fixing segments of the sensor unit.

When a load acts between the tire of the vehicle wheel and the road surface, such load is applied to the stationary member (for example, the outer member), which is the stationary member of the wheel support bearing assembly, accompanied by deformation. In this instance, two or more of the contact fixing segments of the strain generating member in the sensor unit are fixed to an outer diametric surface of the outer member and a groove is provided between the neighboring, two contact fixing segments in the sensor unit on the outer diametric surface of the outer member and the rigidity in the vicinity of a site at which the groove is provided is lowered. For this reason, fixing portions on the outer diametric surface of the outer member, at which the neighboring, two contact fixing segments in the sensor unit are fixed, respectively, provide sites at which the amount of deformation is large. As a result, the large strain is generated in the strain generating member to which the strain occurring in the outer diametric surface of the outer member is, after having been amplified, transmitted, and the strain so amplified and transmitted can be detected by the sensor with a high sensitivity. As hereinabove described, since the sensor unit is not fixed to any protruding portion of the flange of the outer member, which tends to constitute a cause of the hysteresis, but is arranged on a portion of the outer diametric surface of the outer member that is distant from the protruding portions, the hysteresis occurring in the output signal of the sensor is reduced, allowing the load to be detected accurately. In view of this, without being adversely affected by the influences brought about by the hysteresis, the load imposed on the vehicle wheel can be detected with a high accuracy.

In the present invention, the strain generating member in the sensor unit may be provided with a cutout and the sensor is provided in proximity to the cutout. In the case of this construction, the strain that is, after having been amplified, transmitted from the stationary member to the strain generating member can be easily concentrated on the cutout and, therefore, the detecting sensitivity of the sensor increases and the load can be further accurately detected.

In the present invention, the contact fixing segments of the sensor unit may be arranged on the outer diametric surface of the stationary member at respective positions that lie at the same phase in a direction circumferentially thereof. Since the amount of deformation of the outer diametric surface of the outer member varies depending on the axial position on such outer diametric surface, arrangement of the contact fixing segments in the sensor unit at the respective positions that lie at the same phase in the circumferential direction is effective to allow the strain to be easily centered on the strain generating member and, hence, the detecting sensitivity can be increased correspondingly.

In the present invention, the contact fixing segments of the sensor unit may be arranged on the outer diametric surface of the stationary member at respective positions that lie at the same position in a direction axially thereof.

Since the amount of deformation of the outer diametric surface of the outer member varies depending on the radial position on such outer diametric surface, fixing of the contact fixing segments in the sensor unit to the outer diametric surface at the respective positions that lie at the same position in the axial direction is effective to allow the strain to be easily centered on the strain generating member and, hence, the detecting sensitivity can be increased correspondingly.

In the present invention, at least one of fixing portions of the stationary member, at which the respective contact fixing segments in the sensor unit are fixed, may be arranged in proximity to an axial position where there is the rolling surface. In the case of this construction, since the sensor unit comes to be installed at a position at which the amount of deformation is relatively large, the strain can be easily concentrated on the strain generating member and, hence, the detecting sensitivity can be increased correspondingly, thus allowing the load to be accurately detected.

In the present invention, the stationary member may have an outer periphery provided with a vehicle body fitting flange adapted to be secured to a knuckle; bolt holes for receiving bolts to be fitted to the knuckle may be provided at a corresponding number of circumferential portions of this flange; the flange may have circumferential protruding portions, in which the bolt holes are provided, protruding radially outwardly beyond the remaining portion of the flange; and the to-be-contact-fixed portions of the stationary member, to which the contact fixing segments in the sensor unit are fixed, may be arranged intermediate between the neighboring protruding portions. In the case of this construction, since the sensor unit comes to be installed at a position distant from any protruding portion, which tends to constitute a cause for the hysteresis, the hysteresis occurring in the output signal of the sensor can be further reduced and the load can therefore be detected further accurately.

In the present invention, a portion of the stationary member may be provided with a thick walled portion that is partially thick in wall thickness.

If as hereinabove described the thick walled portion is provided in a portion of the stationary member, the rigidity of that portion can be increased and that portion will become a portion at which the amount of deformation is small enough to be less affected by the hysteresis. In view of this, where the sensor unit is to be fixed on the outer diametric surface of the stationary member, fixing of one of the contact fixing segments of the strain generating member in proximity to, for example, the thick walled portion allows the hysteresis occurring in the output signal of the sensor to be reduced.

In the present invention, one of the contact fixing segments in the sensor unit may be fixed to the thick walled portion. When as described above, one of the contact fixing segments in the sensor unit is fixed to the thick walled portion at which the amount of deformation is small whereas the other of the contact fixing segments is fixed to a site at which the amount of deformation is relatively large, the strain can be easily concentrated on the strain generating member and the detecting sensitivity of the sensor can be increased, allowing the load to be detected further accurately.

In the present invention, at least one of the sensor units may be arranged on an upper surface portion of the outer diametric surface of the stationary member relative to a tire contact surface.

If one of the sensor units is provided at a position on the outer diametric surface of the stationary member, at which the load of the rolling elements can be applied at all times even when the load Fz acting in the vertical direction or the load Fy acting in the transverse direction is applied, that is, at a position that defines an upper surface portion relative to the tire contact surface, the load can be detected with a high accuracy at any event.

In the present invention, the sensor unit may be of a type capable of detecting a load Fz acting on the wheel support bearing assembly in a vertical direction.

Since the sensor unit is used to amplify and detect even the slightest strain, even the load Fz acting in the vertical direction, with which the amount of deformation of the stationary member is small, can be detected with a high sensitivity.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

A first preferred embodiment of the present invention will now be described in detail with particular reference to FIGS. 1 to 5. This embodiment is directed to a inner ring rotating type wheel support bearing assembly of a third generation model, which is used to rotatably support a vehicle drive wheel. It is to be noted that in the description that follows, one side of a vehicle body structure laterally away from the longitudinal center thereof in a condition, in which the bearing assembly is mounted on the vehicle body structure, is referred to as "outboard" whereas the opposite side of the vehicle body structure laterally close towards the longitudinal center thereof in the same condition is referred to as "inboard".

Figure 1:
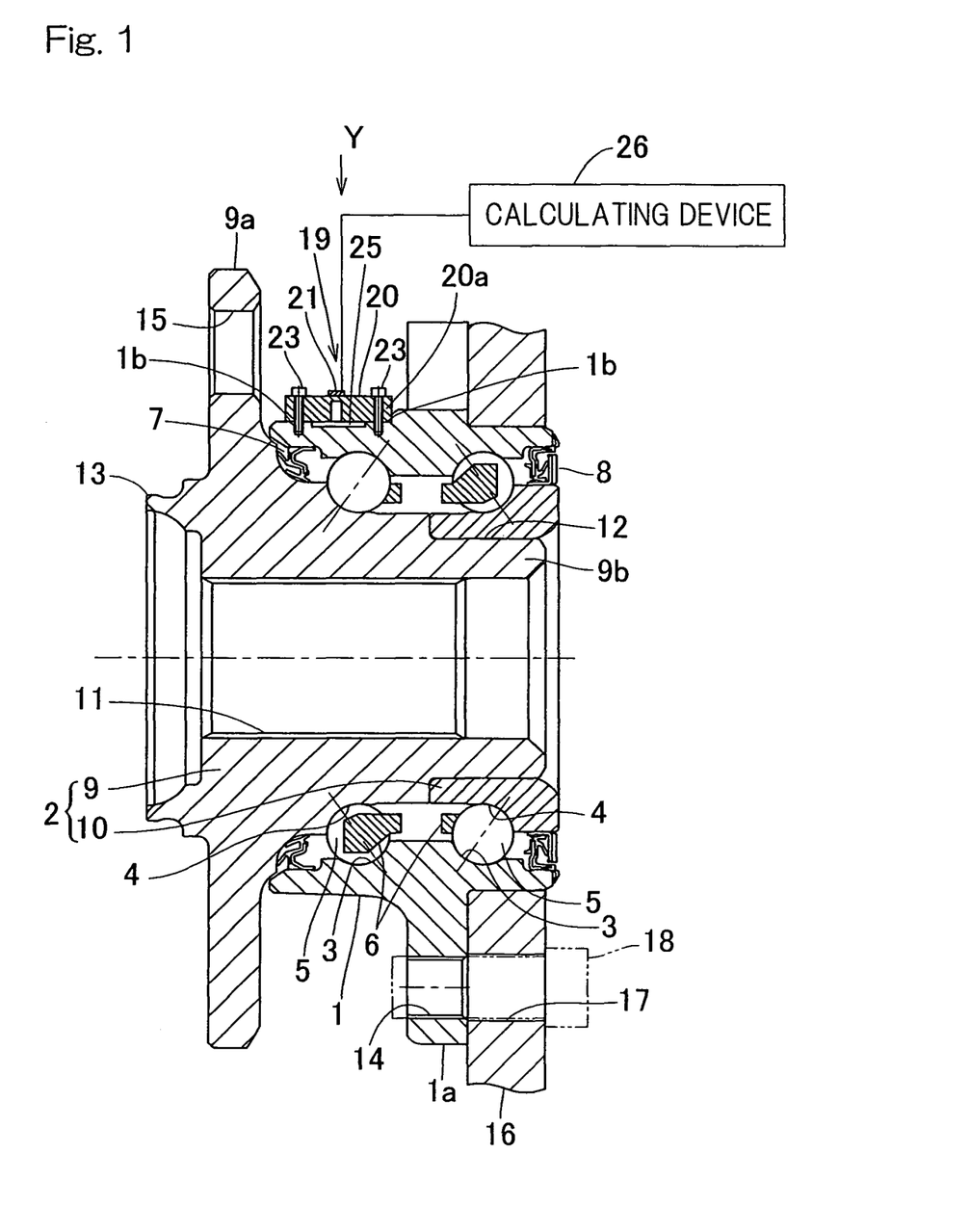
FIG. 1 is a sectional view showing a sensor equipped wheel support bearing assembly according to a first preferred embodiment of the present invention.

A bearing unit employed in this sensor equipped wheel support bearing assembly includes, as shown in a sectional representation in FIG. 1, an outer member 1 having an inner periphery formed with a plurality of rows of rolling surfaces 3, an inner member 2 having rolling surfaces 4 defined therein in face-to-face relation with the respective rolling surfaces 3, and a plurality of rows of rolling elements 5 interposed rollingly between the rolling surfaces 3 in the outer member 1 and the rolling surfaces 4 in the inner member 2. This wheel support bearing assembly is rendered to be of a double row angular contact ball bearing type, in which the rolling elements 5 are employed in the form of balls and are retained by a retainer 6 employed for each of the rows. The rolling surfaces 3 and 4 have a sectional shape representing an arcuate shape and are so formed as to permit the ball contact angles to lie in back-to-back relation with each other. Opposite ends of a bearing space delimited between the outer member 1 and the inner member 2 are sealed by respective pairs of sealing members 7 and 8.

The outer member 1 is of a type that serves as a stationary member and is of one piece construction including a vehicle body fitting flange 1a defined in an outer periphery thereof and adapted to be secured to a knuckle 16 of a suspension system (not shown) of an automotive vehicle. The flange 1a has vehicle body fitting bolt holes 14 defined therein at a plurality of locations spaced in a direction circumferentially thereof and, therefore, the vehicle body fitting flange 1a can be secured to the knuckle 16 when knuckle bolts 18 inserted from an inboard side into respective bolt insertion holes 17 defined in the knuckle 16 are threaded into the corresponding bolt holes 14.

The inner member 2 is of a type that serves as a rotatable member and includes a hub unit 9, having a wheel mounting hub flange 9a formed therein, and an inner ring 10 mounted on an outer periphery of an inboard end of a hub axle 9b of the hub unit 9. The rows of the rolling surfaces 4 referred to above are formed respectively in the hub unit 9 and the inner ring 10. An outer periphery of an inboard end of the hub unit 9 is provided with an inner ring mounting surface 12 that is stepped to render it to have a reduced diameter, with the inner ring 10 mounted on this inner ring mounting surface 12. The hub unit 9 has a center portion formed with a center bore 11. The hub flange 9a is provided with press fitting holes 15 defined at a plurality of locations, spaced in a direction circumferentially thereof, for receiving corresponding hub bolts (not shown). In proximity to a root portion of the hub flange 9a of the hub unit 9, a cylindrical pilot portion 13 for guiding a vehicle wheel and a brake component protrudes towards the outboard side.

Figure 2:
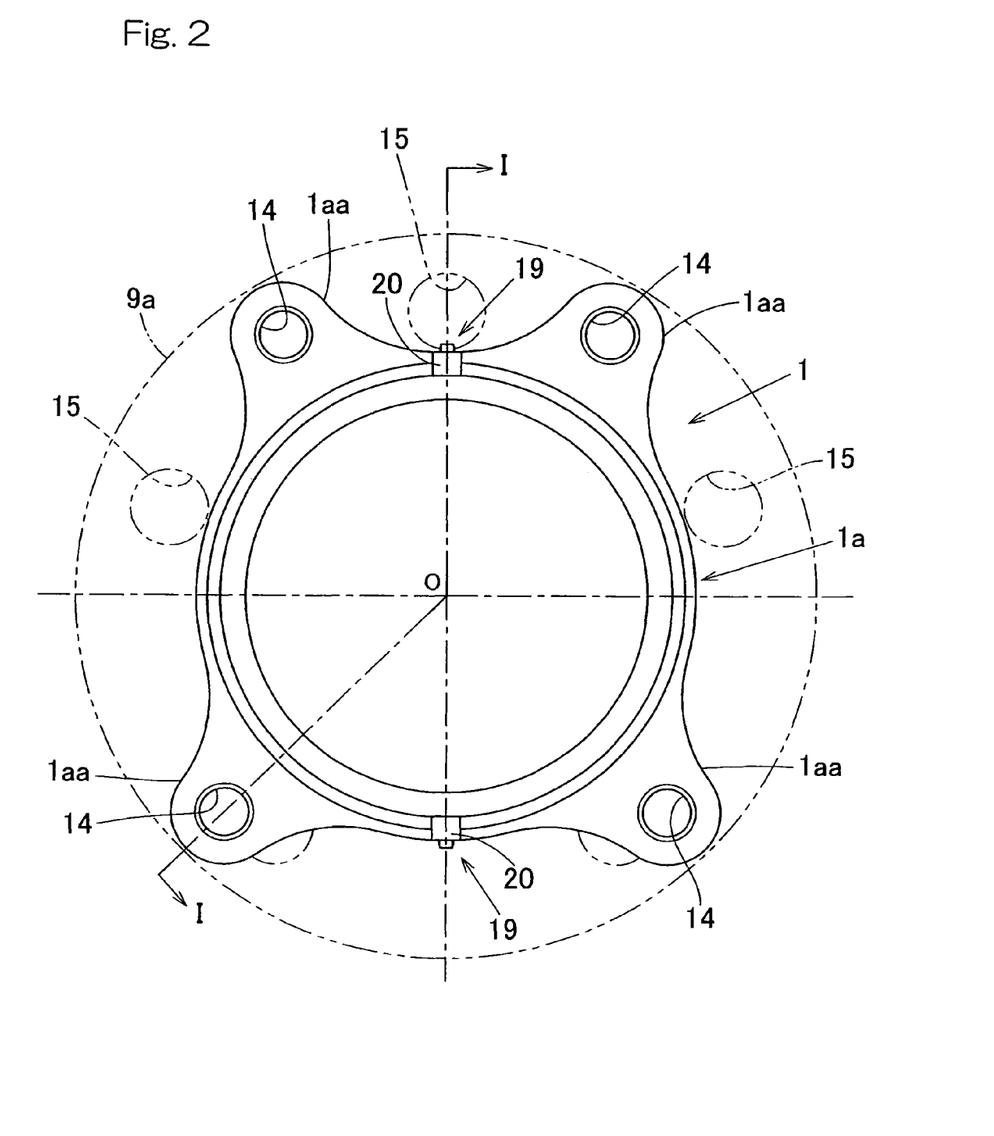
FIG. 2 is a front elevational view showing an outer member employed in the sensor equipped wheel support bearing assembly.

FIG. 2 illustrates a front elevational view showing the outer member 1 of the wheel support bearing assembly as viewed from the outboard side. It is to be noted that FIG. 1 illustrates a cross sectional view taken along the arrow headed line I-I in FIG. 2. The vehicle body fitting flange 1a referred to previously is, as best shown in FIG. 2, rendered to be in the form of projecting segments (protruding portions) 1aa which are formed by projecting respective portions of the circumferential area, where the corresponding bolt holes 14 are formed, in a direction radially outwardly beyond the remaining area.

A sensor unit 19 is provided on an outer diametric surface of the outer member 1 serving as the stationary member. In the instance as shown, the sensor unit 19 is provided at each of two locations in the outer diametric surface of the outer member 1, that is, on upper and lower surface portions of the outer diametric surface of the outer member 1, which are positioned one above the other in a vertical direction perpendicular to a tire contact surface so that a load Fz acting on the wheel support bearing assembly in the vertical direction can be detected. More specifically, as best shown in FIG. 2, one of the sensor units 19 is arranged on an area of the upper surface portion of the outer diametric surface of the outer member 1, which lies intermediate between the neighboring two projecting segments 1aa, whereas the other of the sensor units 19 is arranged on an area of the lower surface portion of the outer diametric surface of the outer member 1, which similarly lies intermediate between the neighboring two projecting segments 1aa.

Figure 3:
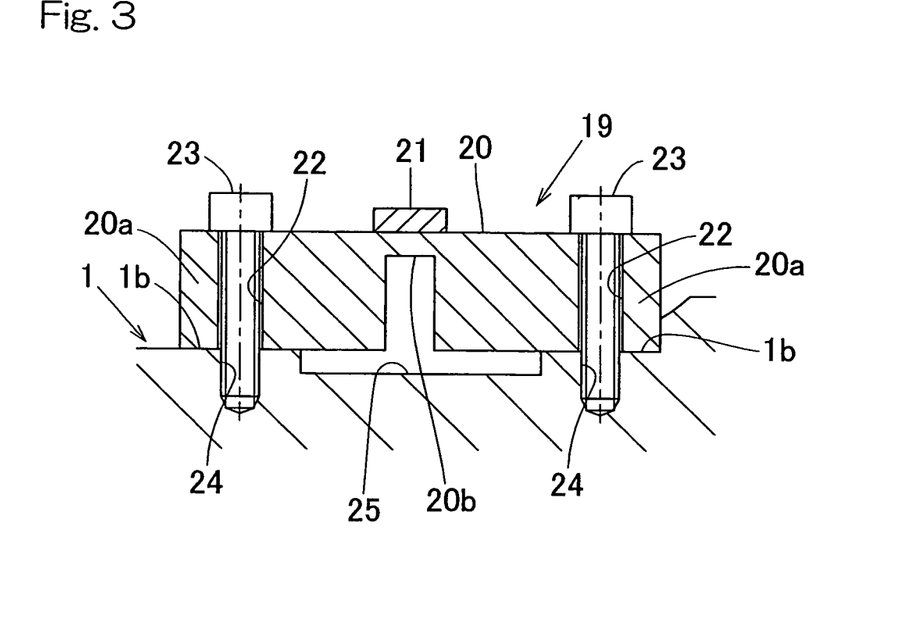
FIG. 3 is an enlarged sectional view showing a sensor unit installing site shown in FIG. 1.
Figure 4:
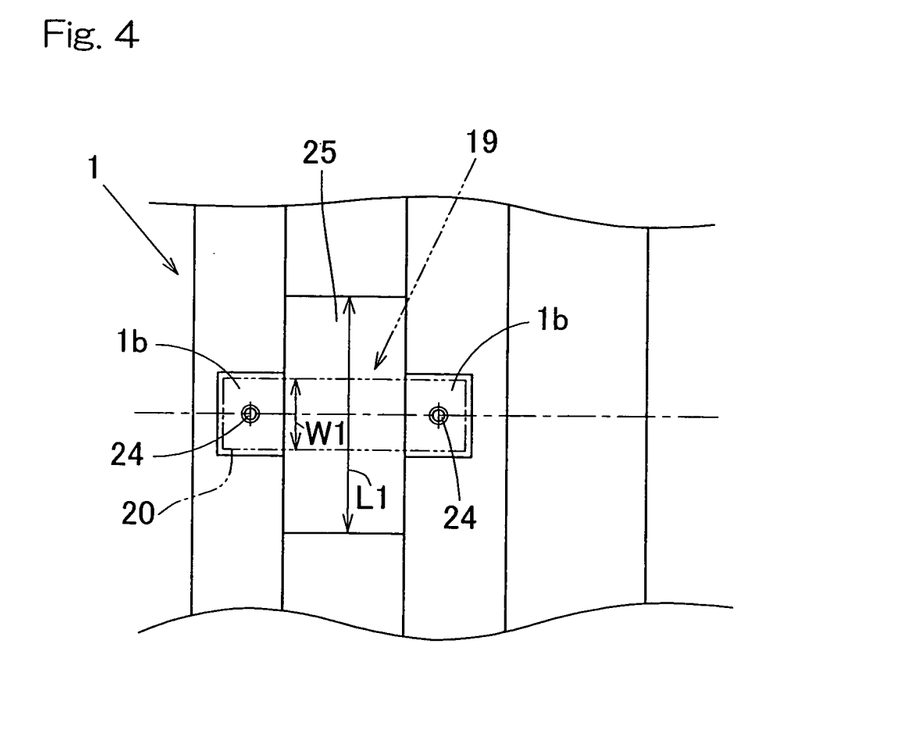
FIG. 4 is a fragmentary top plan view showing an outer member outer diametric surface before a sensor unit is fixed thereto, as viewed in a direction along the arrow headed line Y in FIG. 1.

As best shown in an enlarged sectional representation in FIG. 3, each of the sensor units 19 includes a strain generating member 20 and a sensor 21 fitted to the strain generating member 20 for detecting a strain induced in the strain generating member 20. The strain generating member 20 is made of a metallic material such as, for example, a steel material. This strain generating member 20 has two outwardly protruding contact fixing segments 20a on an inner surface side confronting the outer diametric surface of the outer member 1 and is fixed directly to the outer diametric surface of the outer member 1 through those contact fixing segments 20a. Of the two contact fixing segments 20a, one contact fixing segment 20a is arranged at an axial position, which forms a circumference of the rolling surface 3 of the outboard row in the outer member 1 shown in FIG. 2, whereas the other contact fixing segment 20a is arranged at a position on the outboard side and away from this axial position, and those contact fixing segments 20a are arranged at the respective positions that are in the same phase relative to each other in the direction circumferentially of the outer member 1. As best shown in FIG. 4 showing a top plan view (a top plan view before the sensor unit 19 is fixed) showing the outer diametric surface of the outer member 1 as viewed in a direction shown by the arrow headed line Y in FIG. 1, a fixing portion 1b, which defines an area of the outer diametric surface of the outer member 1 where the contact fixing segment 20a is fixed, is rendered to be a flat area so that the sensor unit 19 can be stably fixed. It is to be noted that the contact fixing segments 20a of the strain generating member 20 may be two or more in number.

Also, the strain generating member 20 shown in FIG. 3 has its axially intermediate portion formed with a cutout 20b opening towards an inner surface side. The sensor 21 is pasted to an area of the strain generating member 20 where the strain is considerably high relative to a load acting in various direction. In the instance as shown, for that area, an area of the strain generating member 20 proximate to the cutout 20b, more specifically an area on an outer surface side of the strain generating member 20 and on a rear side of the cutout 20b is selected so that the sensor 21 can detect the strain occurring in proximate to the cutout 20b.

Fixture of the contact fixing segments 20a of the strain generating member 20 to the outer diametric surface of the outer member 1 is carried out by threading bolts 23, which have been passed through respective bolt insertion holes 22 defined in the contact fixing segments 20a so as to extend completely therethrough in the radial direction, into corresponding bolt holes 24 defined in an outer peripheral portion of the outer member 1, but instead thereof it may be carried out by the use of a bonding material.

Also, a portion of the outer diametric surface of the outer member 1, which lies between the neighboring two contact fixing segments 20a and 20a in the sensor unit 19, that is, between the two fixing portions 1b and 1b formed in the flat surface area is provided with a groove 25. The groove 25 is, as best shown in FIG. 4, formed only at a circumferential partial portion of the outer member 1 so that the rigidity of the outer member 1 will not be lowered excessively, and has a length L1, as measured in a direction circumferentially of the outer member 1, which is preferably so chosen as to be within the range of about 1×W1 to 5×W1, W1 being the width of the contact fixing segments 20a of the strain generating member 20 as measured in a direction circumferentially of the contact fixing segment 20a.

The sensor 21 of the sensor units 19 is connected with a calculating device 26. This calculating device 26 is a device for calculating (estimating) a working force acting between a tire of the vehicle wheel and a road surface in reference to an output signal from the sensor 21 and includes, for example, a signal processing circuit and a correcting circuit. The calculating device 26 also includes a relation setting device (not shown), in which a relation between the working force between the tire of the vehicle wheel and the road surface and an output signal of the sensor 21 is set in terms of an arithmetic expression or a table or the like and makes use of the relation setting device to output the working force from the output signal which has been inputted. Contents to be set in the relation setting device are determined by a series of preparatory tests and/or simulations and are then set therein.

When a load acts between the tire of the vehicle wheel and the road surface, such load is applied to the outer member 1, which is the stationary member of the wheel support bearing assembly, accompanied by deformation. If the sensor unit 19 is installed on, for example, the projecting segment 1aa of the outer member flange 1a so that the load can be calculated from the deformation of the outer member flange 1a, hysteresis occurs in the output signal as discussed in connection with the conventional art.

In the instance now under discussion, the two contact fixing segment 20a of the strain generating member 20 in the sensor unit 19 are fixed to the outer diametric surface of the outer member 1, and the groove 25 is provided between the neighboring, two contact fixing segments 20a in the sensor unit 19 on the outer diametric surface of the outer member 1 and, therefore, the rigidity in proximity to the site where the groove 25 is provided is lowered. For this reason, the fixing portions 1b on the outer diametric surface of the outer member 1, where the neighboring, two contact fixing segments 20a in the sensor unit 19 are fixed, provide respective sites at which the amount of deformation is large. As a result, the large strain is generated in the strain generating member 20 to which the strain occurring in the outer diametric surface of the outer member 1 is, after having been amplified, transmitted, and the strain so amplified and transmitted can be detected by the sensor 21 with a high sensitivity.

The calculating device 26 is operable to calculate from the output signal of the sensor 21 the load acting on the wheel support bearing assembly. Accordingly, the working force developed between the tire of the vehicle wheel and the road surface can be detected with a sensitivity regardless of whether the automotive vehicle is held halted or whether it is driven at a low speed. Since as hereinbefore described, the sensor unit 19 is not secured to any projecting segment 1aa of the outer member flange 1a, which would constitute a cause of the hysteresis, is provided on the outer diametric surface of the outer member 1 at a position distance from the projecting segments 1aa, the hysteresis occurring in the output signal of the sensor 21 can be reduced and, therefore, the load can be calculated accurately.

Also, the calculating device 26 referred to above may be of a type capable of detecting not only the working force developed between the tire of the vehicle wheel and the road surface, but also a force (for example, the amount of preload) acting on the wheel support bearing assembly.

When the detected load obtained from the sensor equipped wheel support bearing assembly is used in controlling the automotive vehicle, it can contribute to the stabilized travel of the automotive vehicle. Also, when this sensor equipped wheel support bearing assembly is utilized, the load sensor can be installed on the automotive vehicle compactly and the mass productivity becomes excellent, resulting in capability of reducing the cost.

Also, since in this embodiment described above, the strain generating member 20 of the sensor unit 19 is provided with the cutout 20b and the sensor 21 is disposed around this cutout 20b, the strain amplified and then transmitted from the outer diametric surface of the outer member 1 to the strain generating member 20 can be easily centered on the cutout 20b, accompanied by increase of the sensitivity with which the sensor 21 detects and, therefore, the load can be calculated further accurately.

Also, although the amount of deformation induced in the outer member 1 as a result of application of the load thereto varies depending on the axial position, since the two contact fixing segments 20a of the strain generating member 20 in the sensor unit 19 in this embodiment are held and fixed at the same phase in the direction circumferentially thereof, the strain can be easily centered on the strain generating member 20 and the detecting sensitivity is correspondingly increased.

Also, in this embodiment described above, one of the contact fixing segments 20a in the sensor unit 19 is fixed to a portion of the outer diametric surface of the outer member 1 at an axial position in the vicinity of the rolling surface 3 of the outboard side. This axial position is the site where the load applied from the tire contact surface is transmitted from the inner member 2 through the rolling elements 5 and where the amount of deformation is accordingly relatively large. For this reason, it is clear that the sensor unit 19 is installed on that portion of the outer diametric surface of the outer member 1 at which the amount of deformation is relatively large and, therefore, the strain can be easily centered and the detecting sensitivity is correspondingly increased and, further, the load can be calculated accurately.

Also, since in this embodiment described above, the sensor unit 19 is arranged on the outer diametric surface of the outer member 1 and at a position corresponding to a portion of the outer member flange 1a intermediate between the neighboring, two projecting segments 1aa, it is clear that the sensor unit 19 is provided at a position distance from the projecting segments 1aa, which constitute a cause of the hysteresis, and the hysteresis appearing in the output signal of the sensor 21 is further reduced, allowing the load to be calculated further accurately.

Also, since in this embodiment described above, the sensor unit 19 is provided at the position on the outer diametric surface of the outer member 1, where the load applied to the rolling elements 5 can be applied at all times even though the load Fz acting in the vertical direction or the load Fy acting in a forward and rearward direction (a transverse direction perpendicular to the vertical direction) is applied, that is, at the position which lies in an upper surface portion above the tire contact surface, the load can be accurately calculated in what way. Also, since the sensor unit 19 is of a type capable of amplifying and detecting even the slightest strain, even the load Fz acting in the vertical direction, which may result in a small amount of deformation of the outer member 1, can be detected with a high sensitivity.

Figure 5:
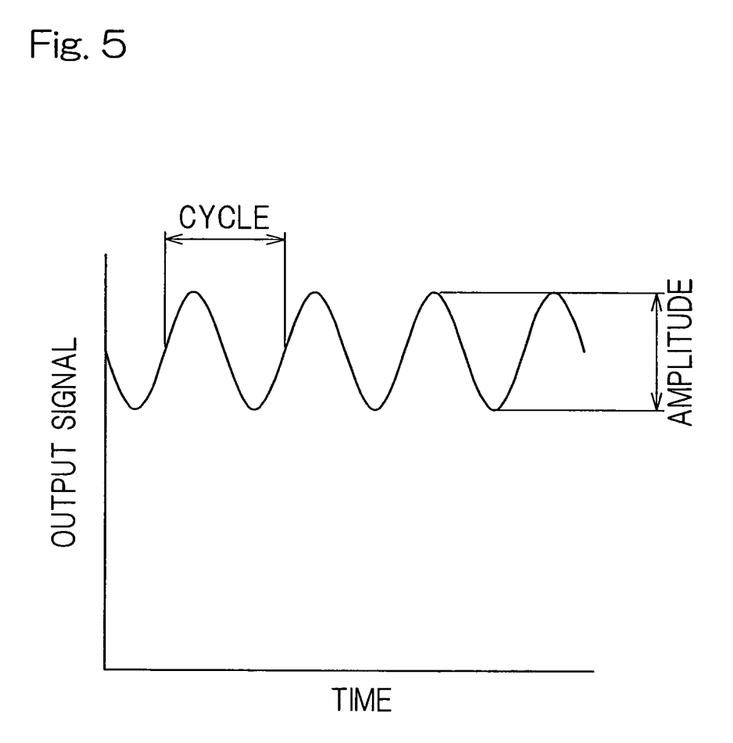
FIG. 5 is a chart showing a waveform of an output signal from the sensor employed in the sensor equipped wheel support bearing assembly.

Furthermore, during the rotation of the wheel support bearing assembly, it may occur that depending on the presence or absence of the rolling elements 5 moving past a site of the rolling surfaces 3 adjacent the sensor unit 19, such a cyclic change may occur in the amplitude of the output signal of the sensor 21 in the sensor unit 19 as shown in a waveform in FIG. 5. The reason therefor is because the amount of deformation during the presence of the rolling elements 5 moving past that site differs from that during the absence of the rolling elements 5 moving past that site and, therefore, the amplitude of the output signal of the sensor 21 may have a peak value for each cycle the rolling elements 5 move past that site. In view of this, the speed of movement of the rolling elements 5, that is, the number of revolutions of the vehicle wheel can be detected if the cycle of the peak value in the detected signal is measured by, for example, the calculating device 26. As hereinabove described, in the event that any change appears in the output signal, the load can be calculated in terms of the average value or the amplitude of the output signal. Should any change not appear in the output signal, the load can be calculated in terms of the absolute value of the output signal.

It is to be noted that, in the foregoing embodiment of the present invention, the following structural parameters are not specifically limited and may be changed, modified or altered.

The number of the sensor units 19 employed, locations where the sensor units 19 are disposed, the number of the contact fixing segments 20a, the number of the sensors 21 and the number of the cutouts 20b.

The size, shape and number of the groove 25.

The shape of the sensor units 19 and the manner of fixing the sensor units 19 (e.g., bonding or welding)

Figure 6:
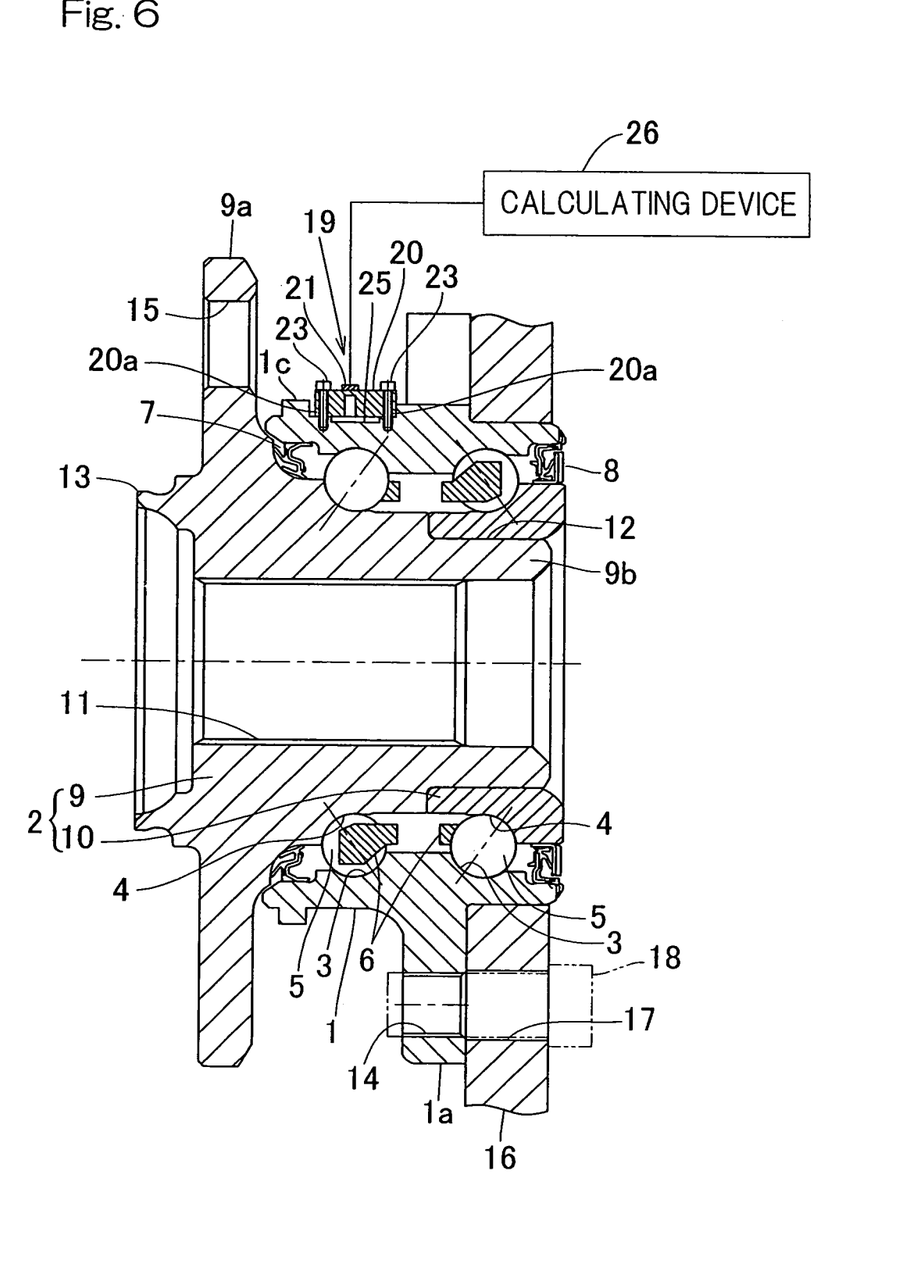
FIG. 6 is a sectional view showing the sensor equipped wheel support bearing assembly according to a second preferred embodiment of the present invention.

FIG. 6 illustrates a second preferred embodiment of the present invention. The sensor equipped wheel support bearing assembly according to this embodiment is similar to that shown in and described with reference to FIGS. 1 to 5 in connection with the first embodiment of the present invention, but differs therefrom in that a portion of the outer periphery of the outer member 1, which is the stationary member, on the outboard side is provided integrally with a thick walled portion 1c protruding radially outwardly over the entire circumference thereof The thick walled portion 1c can be formed, for example, during forging of the outer member 1. One of the contact fixing segments 20a of the sensor unit 19, which is fixed to a portion of the outer diametric surface of the outer member 1 on the outboard side of the sensor unit 19 is arranged in the vicinity of the thick walled portion 1c. Other structural features are similar to those shown in and described with reference to FIGS. 1 to 5 in connection with the first embodiment of the present invention.

In the case of this embodiment, that portion of the outer periphery of the outer member 1, where the thick walled portion 1c is provided, has an increased rigidity and it forms a site where the amount of deformation is small enough to minimize the influence brought about by the hysteresis. Since one of the contact fixing segments 20a of the strain generating member 20 in the sensor unit 19 is fixed to a portion of the outer diametric surface of the outer member 1 in the vicinity of the thick walled portion 1c and the other of the contact fixing segments 20a thereof is fixed to a portion of the outer diametric surface of the outer member 1 in the vicinity of the axial position where the rolling surface 3 of the outboard row is situated, the hysteresis occurring in the output signal of the sensor 21 is reduced enough to allow the load to be calculated accurately.

It is to be noted that in this embodiment, for the thick walled portion 1c on the outer periphery of the outer member 1, a ring shaped member may be mounted on the outer diametric surface of the outer member 1 from the outboard side and may be then firmly secured to the outer diametric surface of the outer member 1 by the use of, for example, a bolt.

Figure 7:
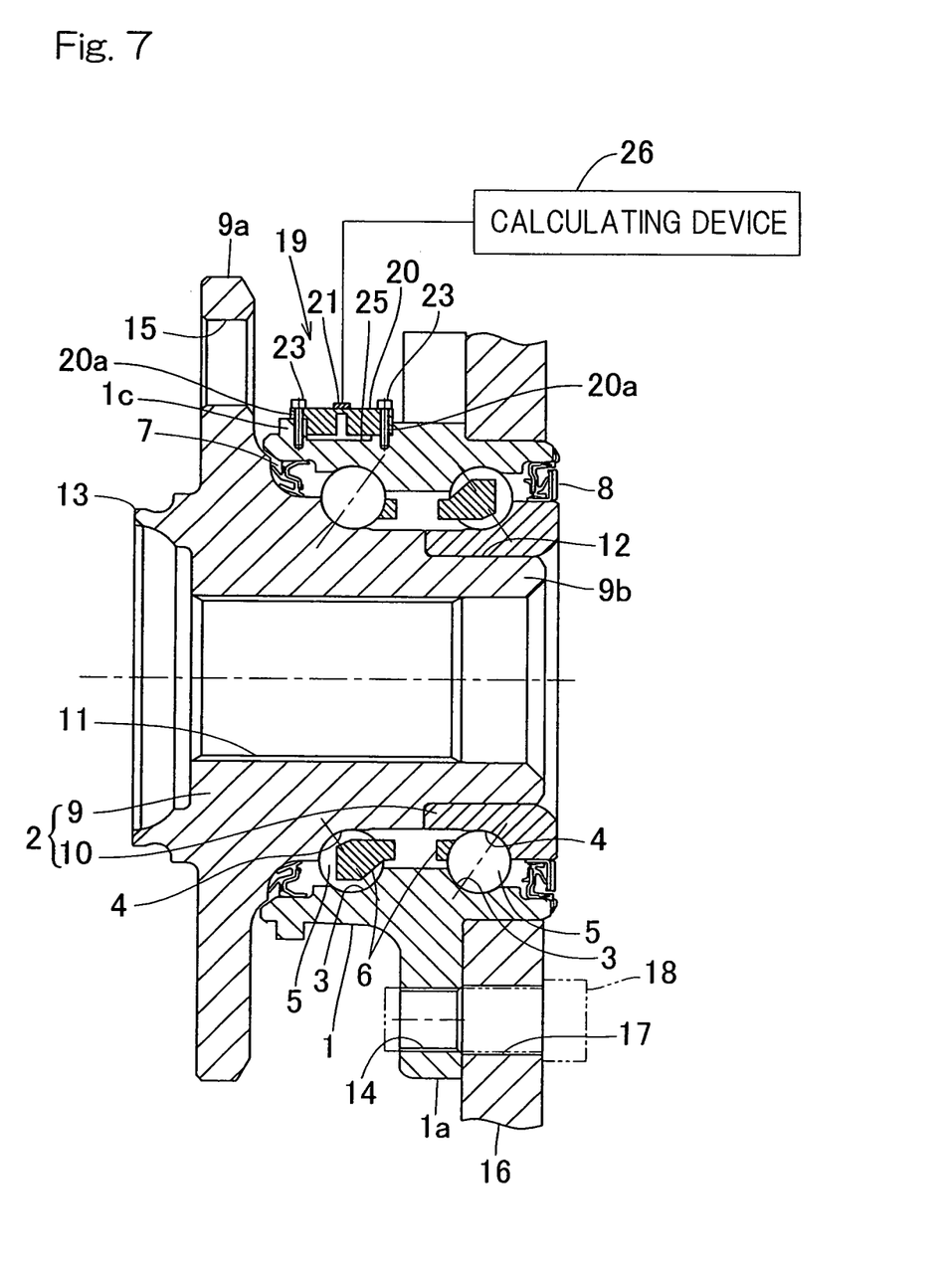
FIG. 7 is a sectional view showing the sensor equipped wheel support bearing assembly according to a third preferred embodiment of the present invention.

FIG. 7 illustrates a third preferred embodiment of the present invention. The sensor equipped wheel support bearing assembly according to this embodiment is similar to that described in connection with the embodiment shown in FIG. 6, but differs therefrom in that one of the contact fixing segments 20a of the strain generating member 20 in the sensor unit 19 is fixed directly to the thick walled portion 1c by the use of a bolt 23, not to that portion of the outer diametric surface of the outer member 1 in the vicinity of the thick walled portion 1c. Other structural features are similar to those shown in and described with reference to FIGS. 1 to 5 in connection with the first embodiment of the present invention.

Where as hereinabove described, one of the contact fixing segments 20a of the strain generating member 20 in the sensor unit 19 is fixed to the thick walled portion 1c at which the amount of deformation is small, the strain can be easily centered on the strain generating member 20 and, therefore, the detecting sensitivity of the sensor 21 increases and, moreover, the load can be further accurately calculated.

Figure 8:
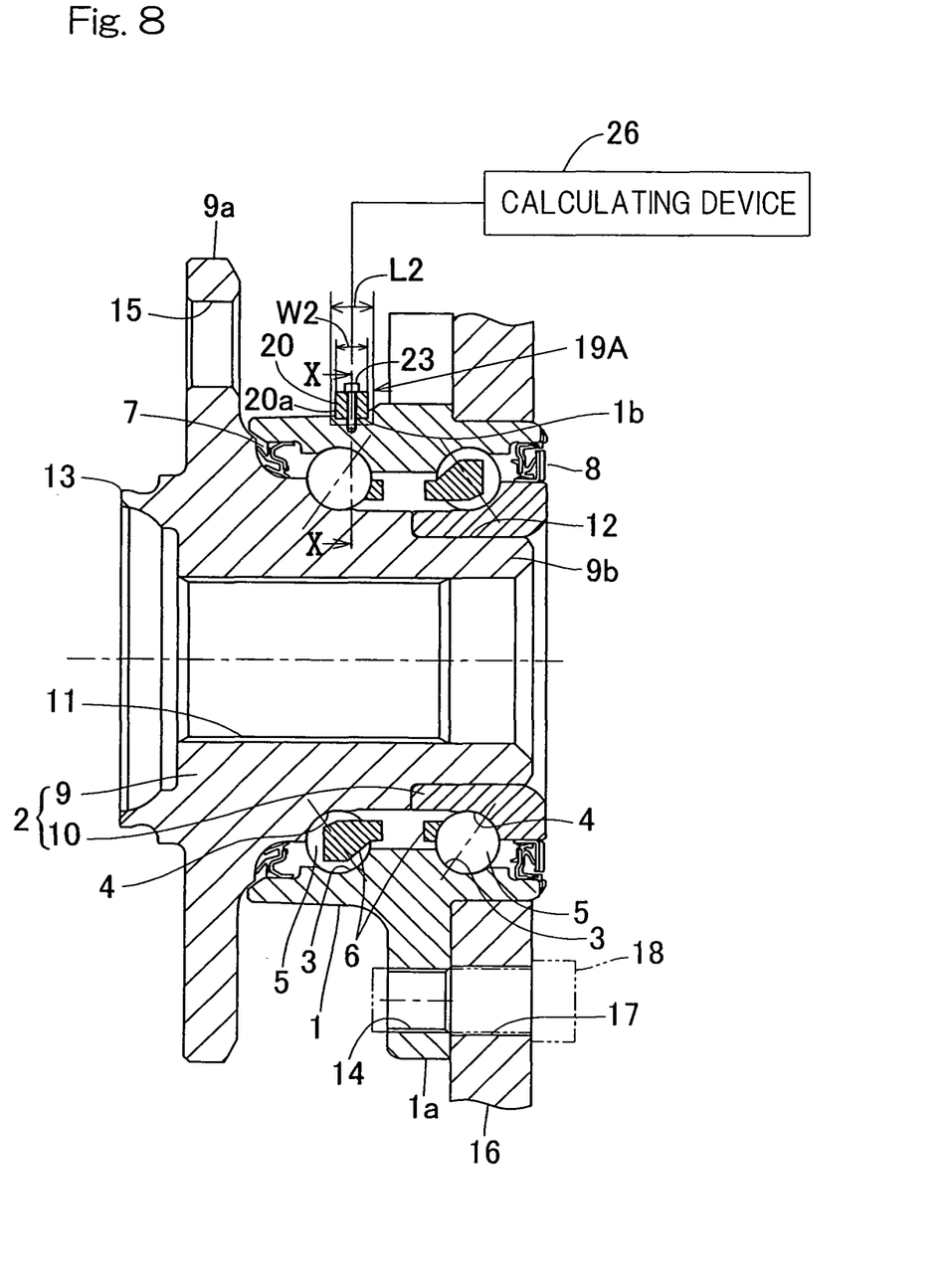
FIG. 8 is a sectional view showing the sensor equipped wheel support bearing assembly according to a fourth preferred embodiment of the present invention.
Figure 9:
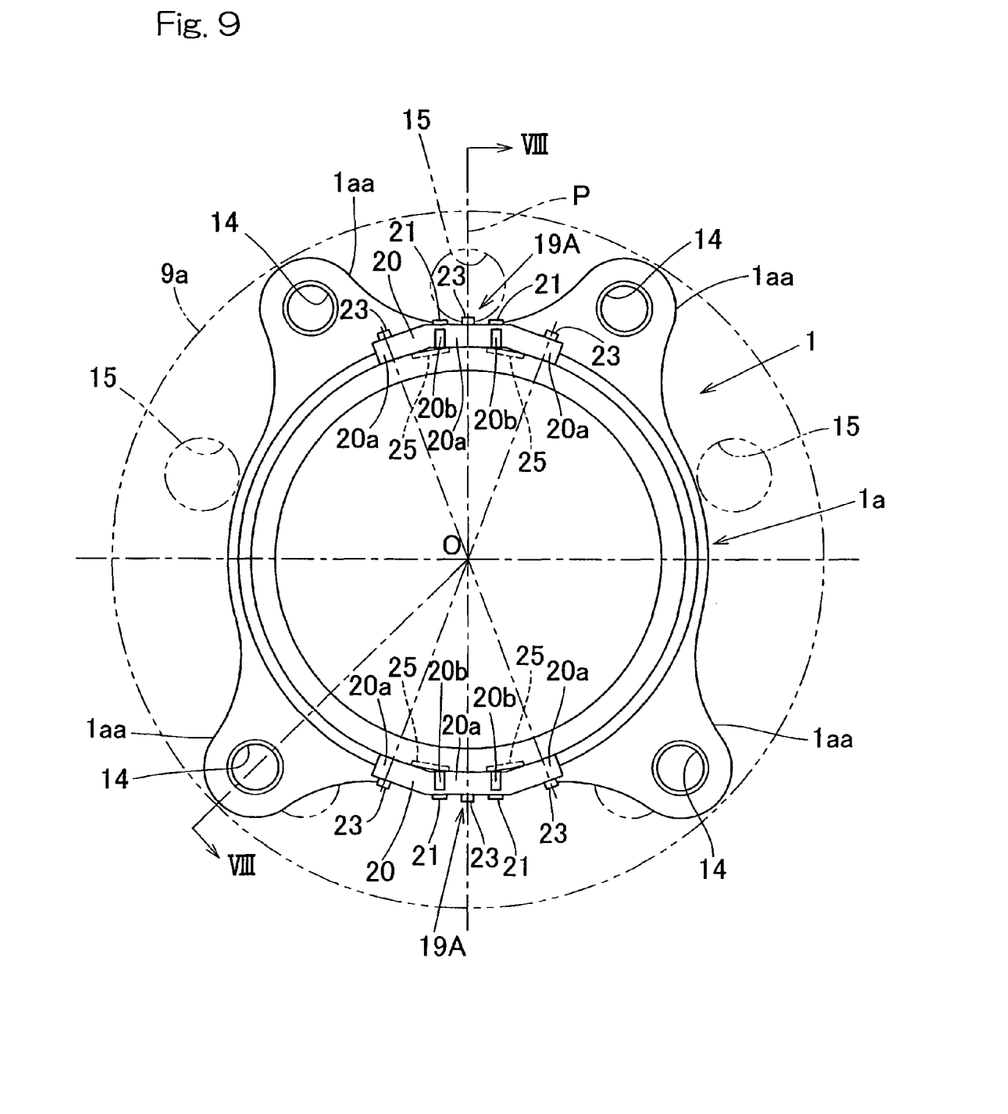
FIG. 9 is a front elevational view showing the outer member employed in the sensor equipped wheel support bearing assembly.

FIGS. 8 to 11 illustrates a fourth preferred embodiment of the present invention. The sensor equipped wheel support bearing assembly according to this embodiment is such that in place of the sensor unit 19 shown in and described with particular reference to FIG. 1, such a sensor unit 19A shown in FIG. 9 showing a front elevational view of the outer member 1 as viewed from the outboard side is employed. It is to be noted that FIG. 8 illustrates a cross sectional view taken along the line VIII-VIII in FIG. 9.

Figure 10:
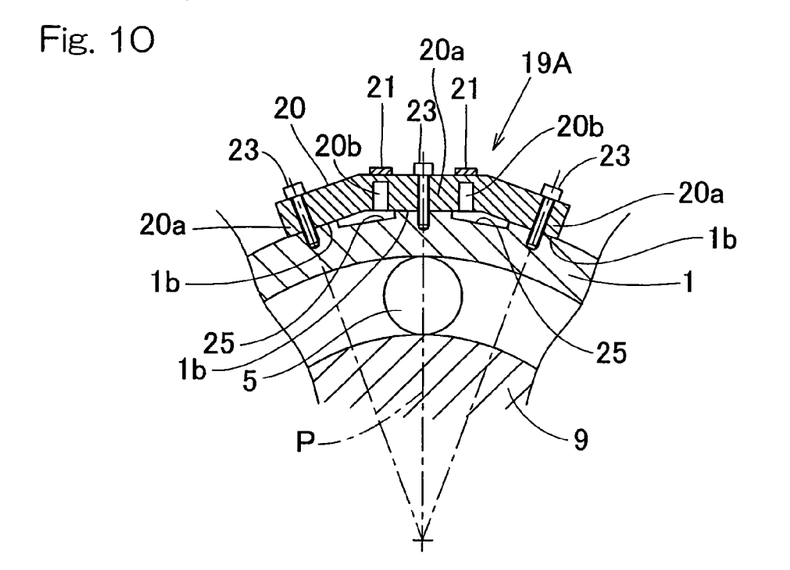
FIG. 10 is a cross sectional view taken along the line X-X in FIG. 8.
Figure 11:
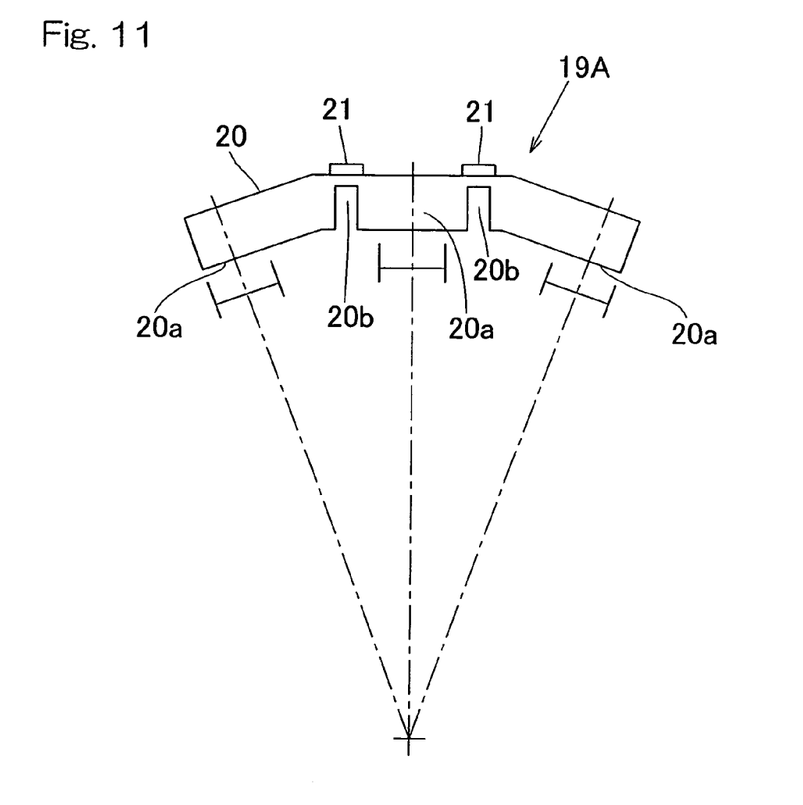
FIG. 11 is an enlarged front elevational view showing the sensor unit employed in the sensor equipped wheel support bearing assembly.

The sensor unit 19A is, as best shown in FIG. 10 showing a cross sectional view taken along the line X-X in FIG. 8, made up of a strain generating member 20, including three contact fixing segments 20a and two cutouts 20b, and two sensors 21. This sensor unit 19A is provided each at upper and lower surface positions on the outer diametric surface of the outer member 1 as shown in FIG. 9. More specifically, the sensor units 19A are so arranged that their corresponding strain generating members 20 can straddle associated equidistantly spaced positions in the circumferential direction with respect to the position of a vertically extending axis P drawn across the outer diametric surface of the outer member 1, with their opposite ends and intermediate portions rendered to define the respective contact fixing segments 20a. Each of the contact fixing segments 20a is fixed to the outer diametric surface of the outer member 1 by means of a corresponding bolt 23. Each of the contact fixing segments 20a is fixed at the same axial position. Since the amount of deformation of the outer diametric surface of the outer member 1 differs in the radial direction, fixing of the contact fixing segments 20a in the manner described above is effective to allow the strain to be easily concentrated on the strain generating members 20 and the detecting sensitivity is correspondingly increased. Each of the fixing portions 1b, at which the respective contact fixing segments 20a are fixed to the outer diametric surface of the outer member 1, is made flat to define a flat area. The axial position of each of the sensor units 19A on the outer diametric surface of the outer member 1 is so chosen to lie at a position in the vicinity of the rolling surface 3 of the outboard row in the outer member 1 as shown in FIG. 8.

Each of the strain generating members 20 shown in FIG. 10 has its inner surface side formed with a cutout 20b that is positioned at a location somewhat separated a distance from the contact fixing segment 20a at that intermediate portion in a direction towards a corresponding end thereof. Also, each of the strain generating members 20 has its outer surface side having two sensors 21 pasted thereto and positioned at a position defining a rear surface side of the cutout 20b. Those sensors 21 of the sensor units 19A are connected with a common calculating device 26 (FIG. 8).

Also, respective portions of the outer diametric surface of the outer member 1, which lie between the neighboring two contact fixing segments 20a in the sensor units 19A, that is, between the circumferentially neighboring two fixing portions 1b and 1b are provided with grooves 25. Each groove 25 is, as best shown in FIG. 8, formed only at an axial partial portion of the outer member 1 so that the rigidity of the outer member 1 will not be lowered excessively. The length L2 of each groove 25, as measured in the axial direction, is preferably so chosen as to be within the range of about 1×W2 to 3×W2, W2 being the width of the contact fixing segments 20a of the strain generating member 20 as measured in the axial direction, but the groove 25 may be formed to be long enough to extend from the inboard end of the fixing portion 1b to an outboard end of the outer member 1. Other structural features are similar to those employed in the embodiment shown in and described with reference to FIGS. 1 to 5.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

What is claimed is:

1. A wheel support bearing assembly for rotatably supporting a vehicle wheel relative to a vehicle body structure, comprising:
   an outer member having an inner periphery formed with a plurality of rows of rolling surfaces, the outer member being stationary;
   an inner member having an outer periphery formed with rolling surfaces opposed to the rolling surfaces of the outer member;
   a plurality of rows of rolling elements interposed between those opposed rolling surfaces in the inner member and the outer member; and
   at least one sensor unit including
      a strain generating member having two or more contact fixing segments arranged in an axial direction of the outer member, the two or more contact fixing segments being adapted to be fixed adjacent to a groove formed in an outer diametric surface of the outer member, and
      a sensor fitted to the strain generating member to detect a strain induced in the strain generating member, the sensor being provided at a location between the two or more contact fixing segments of the at least one sensor unit,
      wherein the groove has a length as measured in a circumferential direction of the outer member and a width measured in the axial direction of the outer member,
      the length of the groove within a range of one to five times a width of the contact fixing segments, the width of the contact fixing segments being measured in a circumferential direction of the outer member, and
      the width of the groove is within a range between the contact fixing segments.

2. The sensor equipped wheel support bearing assembly as claimed in claim 1, in which the strain generating member in the sensor unit is provided with a cutout and the sensor is provided in proximity to the cutout.

3. The sensor equipped wheel support bearing assembly as claimed in claim 1, in which the contact fixing segments of the sensor unit are arranged on the outer diametric surface of the outer member at respective positions that lie at the same plane, the plane being parallel to an axial direction of the outer member.

4. The sensor equipped wheel support bearing assembly as claimed in claim 1, in which at least one fixing portion of the outer member, at which the respective contact fixing segments in the sensor unit are fixed, is arranged in proximity to the rolling surface.

5. The sensor equipped wheel support bearing assembly as claimed in claim 1, in which the outer periphery of the outer member includes:
   a vehicle body fitting flange adapted to be secured to a knuckle; and
   bolt holes for receiving bolts to be fitted to the knuckle provided at a corresponding number of circumferential portions of the flange;
   wherein the flange has circumferential protruding portions, in which the bolt holes are provided, protruding radially outwardly beyond the remaining portion of the flange, and
   fixing portions of the outer member, to which the contact fixing segments in the sensor unit are fixed, are arranged between neighboring circumferential protruding portions.

6. The sensor equipped wheel support bearing assembly as claimed in claim 1, in which a portion of the outer member includes a thick walled portion that is thicker than an adjacent wall portion.

7. The sensor equipped wheel support bearing assembly as claimed in claim 6, in which one of the contact fixing segments in the sensor unit is fixed to the thick walled portion.

8. The sensor equipped wheel support bearing assembly as claimed in claim 1, in which the at least one sensor unit is arranged on an upper surface portion of the outer diametric surface of the outer member relative to a tire contact surface.

9. The sensor equipped wheel support bearing assembly as claimed in claim 1, in which the sensor unit is of a type capable of detecting a load acting on the wheel support bearing assembly in a vertical direction relative to the vehicle body structure.

* * * * *

UNITED STATES PATENT AND TRADEMARK OFFICE
CERTIFICATE OF CORRECTION

PATENT NO. : 8,523,446 B2  
APPLICATION NO. : 12/452908  
DATED : September 3, 2013  
INVENTOR(S) : Hiroshi Isobe et al.

Page 1 of 1

It is certified that error appears in the above-identified patent and that said Letters Patent is hereby corrected as shown below:

On Title Page 2, References Cited, item 56, In Column 2, Under Other Publications, insert -- U.S. Notice of Allowance mailed January 18, 2013 issued in related U.S. Application No. 12/452,909 --.

In the Claims

In Column 12, Line 24, In Claim 1, delete "groove" and insert -- groove is --, therefor.

Signed and Sealed this
Twenty-fourth Day of December, 2013

Margaret A. Focarino
*Commissioner for Patents of the United States Patent and Trademark Office*